W. A. PRATT.
PROCESS FOR WELDING.
APPLICATION FILED MAR. 2, 1920.

1,366,593.

Patented Jan. 25, 1921.
2 SHEETS—SHEET 1.

Inventor
William A. Pratt
By his Attorneys
Sheffield & Betts

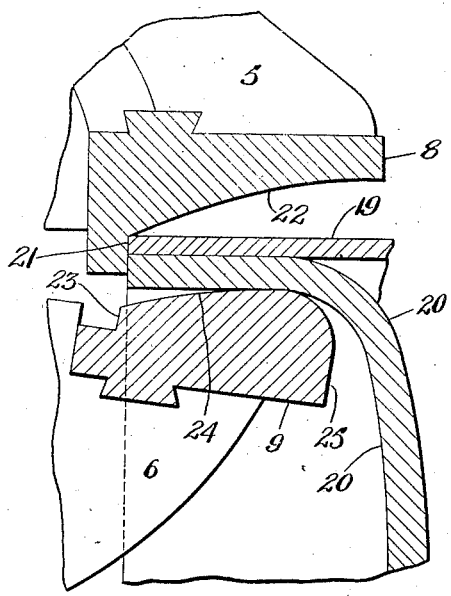
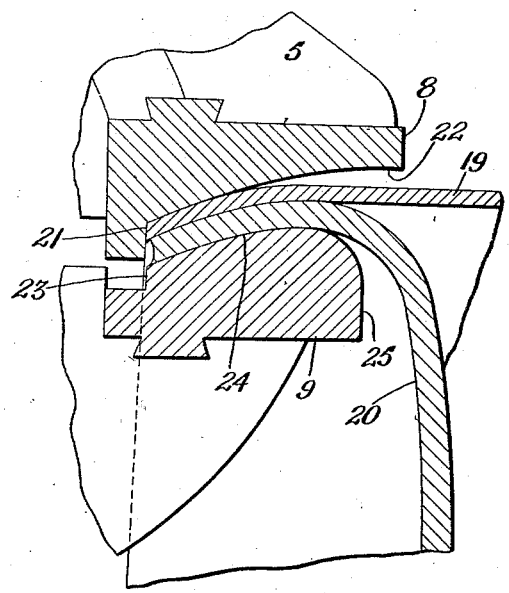
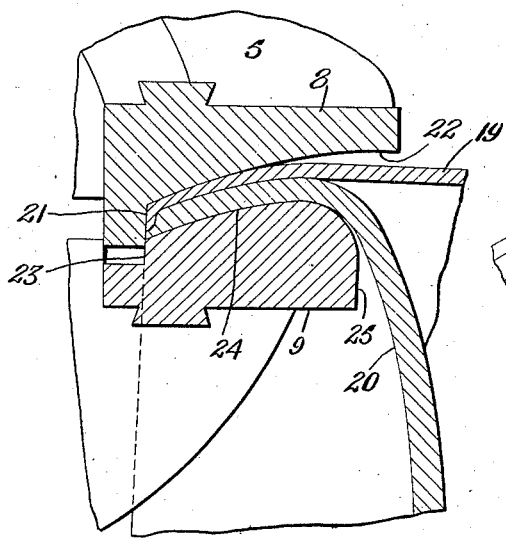
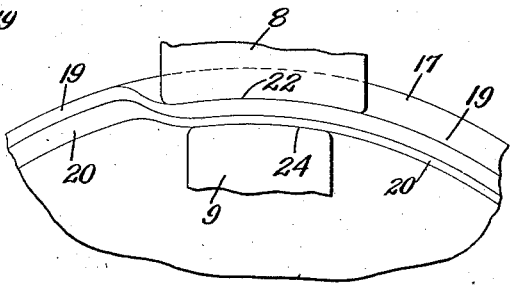

UNITED STATES PATENT OFFICE.

WILLIAM A. PRATT, OF BAYONNE, NEW JERSEY, ASSIGNOR TO THE M. W. KELLOGG COMPANY, OF NEW YORK, N. Y., A CORPORATION OF DELAWARE.

PROCESS FOR WELDING.

1,366,593.  Specification of Letters Patent.  Patented Jan. 25, 1921.

Original application filed January 13, 1919, Serial No. 270,995. Divided and this application filed March 2, 1920. Serial No. 362,776.

*To all whom it may concern:*

Be it known that I, WILLIAM A. PRATT, a citizen of the United States, residing at Bayonne, in the county of Hudson and State of New Jersey, have invented a new and useful Improvement in Processes for Welding, of which the following is a specification.

My invention relates to a process for forming and welding together two contacting layers of metal,—for example, the bottom and shell of a cylinder or tank. The object of my invention is to secure an even edge and a perfect and, therefore, strong weld.

To accomplish this object, I use a process in which the final step thereof causes the edge of one of the layers of metal partially to overlap the edge of the other. I have also invented an apparatus for carrying out my herein described process, said apparatus being described and claimed in my application, Serial No. 270,995, filed Jan. 13, 1919, now United States Letters Patent No. 1,343,277, issued June 15, 1920, of the application for which patent this application is a division. Other objects and advantages of my invention will be apparent to those skilled in the art from reading this specification thereof.

In the drawings, which show one form of welding machine for practising this invention,—

Fig. 2 is a detail view of the welding jaws of said machine, showing their position with relation to the parts to be welded, before pressure has been applied.

Fig. 3 shows the same parts after pressure has been applied and clearly indicates the effect upon the parts to be welded.

Fig. 4 shows the same parts when the operation has been completed and clearly shows how the strong weld is obtained.

Fig. 5 is an end elevation of the cylinder or tank, showing the proportionate size of the welding jaws and the effect of the bending of the parts of the tank in the welding operation.

Throughout the drawings, similar reference characters refer to similar parts.

Figure 1:
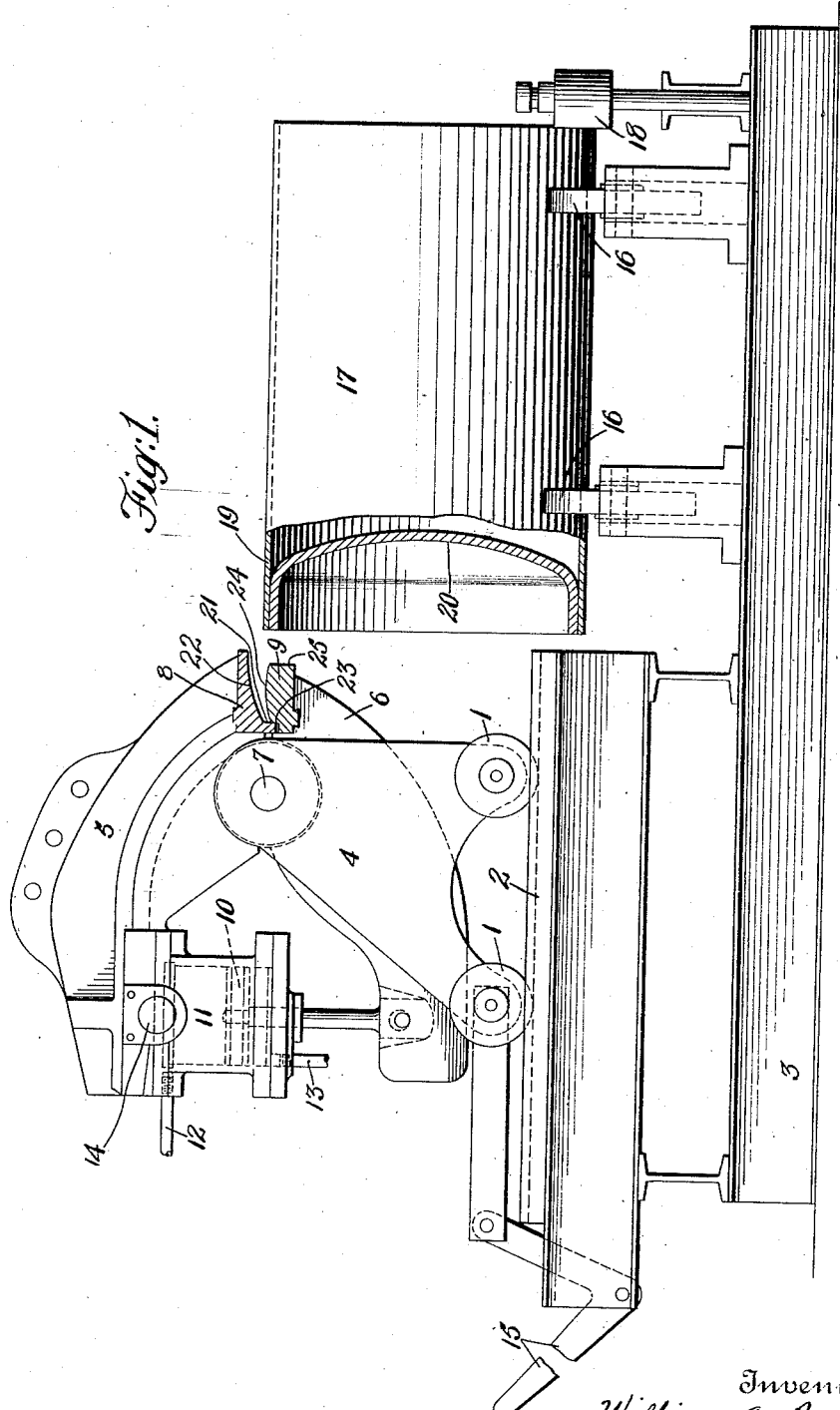
Figure 1 is an elevation of such a machine and includes a tank, the bottom and sides of which are to be welded, certain parts being shown in section.

The apparatus which I have shown in the drawings is mounted on wheels 1, running on tracks 2, resting on the rigid foundation 3. The machine itself comprises a frame 4, and an upper member 5, secured thereto. A lower member 6 is pivotally secured to the frame and upper member, the fulcrum being at 7. Detachably mounted on the upper and lower members are two jaws, 8 and 9, respectively, which are of special shape and pattern for the purpose of accomplishing the desired results. The lower member 6 and jaw 9 are actuated by a piston 10 contained in an air-chamber 11, having two ports 12 and 13,—the air-chamber being attached to the upper frame 5 of my machine by means of a pin 14. The whole machine is moved along the track 2 by means of a lever 15.

On the same foundation is mounted framework for holding the article to be welded in its proper position. This framework comprises, in this specific case, roller saddles with four rollers 16, arranged to carry a cylinder or tank 17. It also comprises another roller 18 which acts as a back stop for the tank. The tank itself consists of an outer cylindrical shell 19 and a concave bottom member 20.

In the apparatus shown, the jaws 8 and 9 are shaped as follows: The upper jaw 8 has a flat surface 21 against which the edges of both shell 19 and bottom member 20 of the tank abut when they are first placed between the jaws. This jaw also has a curved surface 22; the curve is gentle rather than abrupt, leaving the flat surface 21 at an angle not far from the perpendicular and curving slowly toward the perpendicular so as to present a surface that is concave toward the members to be welded. The lower jaw 9 also has a flat surface 23 which, when the jaws are closed (as shown in Fig. 4), partially abuts against the flat surface 21, of the upper jaw. There is also a curved surface 24 on the lower jaw, the first part of which has substantially the same radius of curvature as the surface 22; it presents, however, a convex surface toward the members to be welded. The outer part of the surface 24 is comparatively sharply curved, ending finally in a surface 25 that is parallel to the surfaces 21 and 23.

In carrying out my process on said machine, the machine itself is first moved back on the track by depression of the lever 15 in order to give room for the placing and heating of the article to be welded. Compressed air is introduced into the cylinder 11, through the port 13, thereby raising the piston 10, lowering the jaw 9, and increasing the space between the jaws 8 and 9. The cylinder or tank is then placed on the rollers 16 and against the roller 18, the rollers being so arranged that the portion of the tank to be welded will be horizontally opposite the space between the two jaws 8 and 9. This portion of the tank is then brought to a welding heat by any suitable means (for example, by means of a portable gas furnace). After this has been accomplished, the machine is pushed along the tracks, 2, toward the tank 17 by raising the lever 15 until the tank and jaws assume the position shown in Fig. 2.

The pressure in the lower part of the air-cylinder 11 is then released and compressed air is introduced into the port 12, forcing down the piston 10, turning the lower member 6 of the machine on its fulcrum 7, and raising the jaw 9. The jaws are so designed and positioned that as the lower one rises, it slightly lifts the end of the tank, at the same time bending both shell 19 and the bottom 20 of the tank. In view of the fact that the shell is held against longitudinal motion by the roller 18, the result of this combined lifting and bending is to slide the bottom of the tank an appreciable distance into the shell, at the same time cupping the edge, as is clearly shown in Fig. 3. The curvature in the shell and bottom of the tank resulting from this operation prevents any further relative motion between the jaws and the parts of the tank. Henceforth, the result of the coming together of the jaws is to pull the edge of the shell partly over the edge of the bottom of the tank, in the manner clearly shown in Fig. 4. Fig. 5 also shows this effect, the left side of the drawing showing the proportionate widths of shell and tank-bottom before welding and the right side showing their proportionate widths after welding.

Although I have described only one form of apparatus for carrying out my process and accomplishing the desired result, I am aware that other and different apparatus may be used for such purpose without departure from my invention, and I desire protection for all methods of practising my process that come within the scope of my invention, as defined in the appended claims.

What I claim is:

1. The process of welding two contacting layers of metal comprising bringing the layers, adjacent their edges, to welding temperature, bending the layers transversely so that the edge of one layer recedes from the edge of the other, and subjecting the layers to pressure so that the projecting edge partly overlaps the other to weld the layers within the bent portions.

2. The process of welding two contacting layers of metal comprising bringing the edges to be welded to welding temperature, bending the layers transversely, and subjecting them to pressure simultaneously with the bending.

3. The process of welding two contacting layers of metal comprising bringing the layers, adjacent their edges, to welding temperature, bending the layers transversely, and subjecting them to pressure simultaneously with the bending, so that one edge overlaps the other when the process is completed.

4. The process of welding a head in a metal cylinder comprising placing the head and cylinder in contact around a circumferential zone on the inside of the metal cylinder, bringing the contacting portions of cylinder and head to welding temperature, bending the cylinder and head toward the axis of the cylinder, and forcing the two together simultaneously with the bending, to weld the same.

5. The process of welding a head in a metal cylinder comprising placing the head and cylinder in contact around a circumferential zone on the inside of the metal cylinder, bringing the contacting portions of cylinder and head to welding temperature, bending the cylinder and head toward the axis of the cylinder, and forcing the two together to weld the same, the edges of the cylinder and of the head being deformed and the edge of the cylinder being forced over and pressed into the edge of the head while the two are being pressed together.

6. The process of welding a head in a metal cylinder comprising placing the head and cylinder in contact around a circumferential zone on the inside of the metal cylinder, bringing the contacting portions of cylinder and head to welding temperature, bending the cylinder and head toward the axis of the cylinder, and forcing the two together simultaneously with the bending, to weld the same, the edges of the cylinder and of the head being deformed and the edge of the cylinder being forced over and pressed into the edge of the head while the two are being pressed together.

7. The process of welding a head in a metal cylinder comprising placing the head and cylinder in contact around a circumferential zone on the inside of the metal cylinder, bringing the contacting portions of cylinder and head to welding temperature, holding the cylinder against longitudinal motion, bending the head and cylinder toward the axis of the cylinder so that the edge of the head recedes from the edge of the cylinder, and forcing head and cylinder together to weld the same, the edges of the cylinder and of the head being deformed and the edge of the cylinder being forced over and pressed into the edge of the head while the two are being pressed together.

8. The process of welding a head in a metal cylinder comprising placing the head and cylinder in contact around a circumferential zone on the inside of the metal cylinder, bringing the contacting portions of cylinder and head to welding temperature, bending the cylinder and the head, and forcing the two together to weld the same, the edges of the cylinder and the head being deformed and the edge of the one on the outside of the curve resulting from the bending operation being forced over and pressed into the edge of the other while the two are being pressed together.

9. The process of welding two plates comprising bringing their surfaces into contact and then subjecting them to pressure on opposite sides in directions inclined to the perpendicular to the original surfaces of the plates.

10. The process of welding two layers of metal comprising placing a surface of each layer in contact, with their edges registering; bringing the layers adjacent their edges, to welding temperature; bending the layers transversely so that the edge of one layer recedes from the other; and subjecting the layers to pressure simultaneously with the bending so that the projecting edge is upset so as to overlap the other.

11. The process of welding two contacting parallel portions of sheet metal comprising bringing the said portions adjacent their edges to welding temperature, subjecting said portions to welding pressure transverse to their contacting surfaces, and bending said portions transversely of their contacting surfaces simultaneously with the application of the welding pressure.

12. The process of welding two contacting parallel portions of sheet metal comprising, bringing the said portions, adjacent the edges, to welding temperature, subjecting said portions to welding pressure, transverse to their contacting surfaces, and bending said portions transversely of their contacting surfaces and also drawing said portions one on the other simultaneously with the application of the welding pressure.

WILLIAM A. PRATT.